United States Patent [19]

Crick et al.

[11] Patent Number: 4,528,602

[45] Date of Patent: Jul. 9, 1985

[54] ELECTRICAL CALIBRATION ARRANGEMENTS

[75] Inventors: Neil Crick, Romsey; Anthony Miles, Fawley, both of England

[73] Assignee: Racal Recorders Limited, Bracknell, England

[21] Appl. No.: 468,961

[22] Filed: Feb. 23, 1983

[30] Foreign Application Priority Data

Feb. 25, 1982 [GB] United Kingdom ............... 8205625

[51] Int. Cl.$^3$ ........................... G11B 5/47; G11B 5/02
[52] U.S. Cl. ...................................... 360/66; 360/67
[58] Field of Search ................ 360/65, 66, 67, 68, 360/25, 31

[56] References Cited

U.S. PATENT DOCUMENTS

| | | | |
|---|---|---|---|
| 4,258,397 | 3/1981 | Kitamura et al. | 360/68 |
| 4,279,005 | 7/1981 | Kitamura et al. | 360/66 |
| 4,297,730 | 10/1981 | Kadowaki et al. | 360/66 |
| 4,422,109 | 12/1983 | Sampei et al. | 360/66 |

FOREIGN PATENT DOCUMENTS

| | | | |
|---|---|---|---|
| 2019075 | 10/1979 | United Kingdom | 360/67 |
| 2018006 | 10/1979 | United Kingdom | 360/67 |
| 1561446 | 2/1980 | United Kingdom | 360/67 |
| 2040100 | 8/1980 | United Kingdom | 360/67 |

Primary Examiner—Vincent P. Canney
Attorney, Agent, or Firm—Leydig, Voit, Osann, Mayer & Holt

[57] ABSTRACT

An automatic calibration arrangement for a tape recorder is disclosed. The arrangement includes a microprocessor which responds to pre-stored calibration signals to write predetermined tones onto each track of the tape using the record circuits and record heads of the tape recorder, and then monitors the corresponding signals as replayed by the replay heads and replay circuits of the tape recorder so as to automatically adjust parameters of the record and replay circuits accordingly. The record and replay circuits are arranged to be settable by means of digital numbers produced by the microprocessor. Parameters which may be adjusted include record bias, record drive current (to produce 1% third harmonic distortion), and the mid band and band edge filter circuits, and phase adjustment of the replay circuits. Recorders not having replay circuits (but having replay heads) can still have their bias level and record current calibrated and can record replay calibration frequencies for external calibration purposes.

18 Claims, 7 Drawing Figures

ELECTRICAL CALIBRATION ARRANGEMENTS

BACKGROUND OF THE INVENTION

The invention relates to calibrating arrangements for calibrating electrical circuits, and more specifically to automatic calibration arrangements for automatically calibrating electrical circuits such as in tape recorders for example.

BRIEF SUMMARY OF THE INVENTION

According to the invention, there is provided an automatic calibrating circuitry in magnetic recording apparatus, in which a pre-stored signal is automatically recorded by the apparatus onto a magnetic storage medium via the recording circuitry of the apparatus, the recorded signals being monitored and its value used to adjust at least one predetermined parameter of the recording circuitry.

According to the invention, there is also provided an automatic calibrating arrangement for use with and incorporated in a magnetic storage medium, comprising non-volatile storage means in the recorder storing a plurality of predetermined calibration and control signals, control means responsive to the pre-stored signals to read them out in a predetermined sequence and, in response thereto, to energise the recording circuitry of the recorder so as to record on the magnetic tape calibration signals having predetermined characteristics, the control means being operative to monitor the value of the recorded signals and to calibrate the bias level applied to the record head by the recording circuitry to a predetermined value and to calibrate the record current of the recording circuitry.

DESCRIPTION OF THE DRAWINGS

A tape recorder incorporating an automatic calibration arrangement embodying the invention will now be described, by way of example, with reference to the accompanying diagrammatic drawings in which.

DESCRIPTION OF PREFERRED EMBODIMENTS

The automatic calibration arrangement now to be described enables automatic calibration of various parameters in the tape recorder. The calibration arrangement can carry out automatic calibration of the recording as well as the replay circuits of the recorder. Such parameters as the bias and the amplitude, frequency and phase responses of the record and replay circuits can be automatically calibrated, though other parameters can also be calibrated.

The tape recorder in which the automatic calibration arrangement to be described is incorporated is a multi-channel instrumentation recorder having, for example, twenty eight or forty two tracks each with its associated record and replay circuits, and the automatic calibration arrangement to be described can calibrate the record and replay circuits in each such channel. However, the automatic calibration arrangement can of course be applied to a tape recorder having more or less numbers of tracks and associated channels than this.

Figure 1:
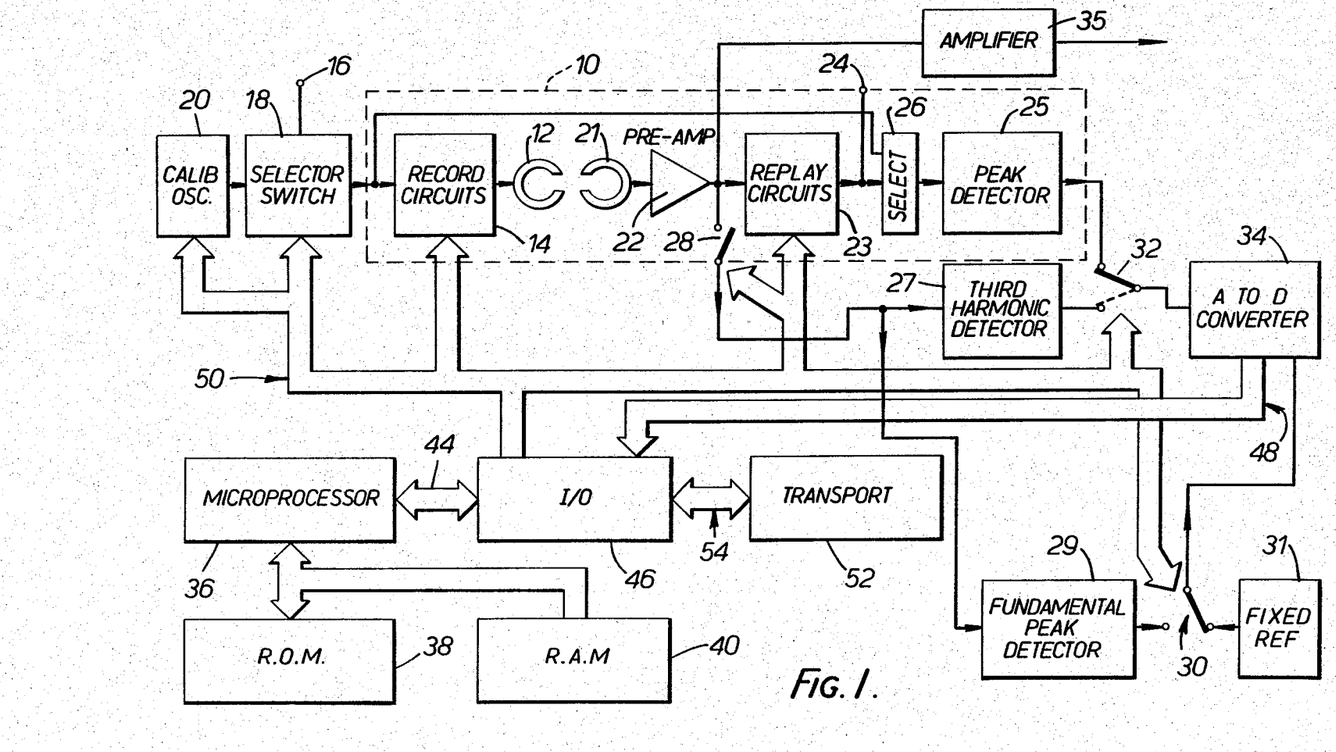
FIG. 1 is a simplified block circuit diagram of the tape recorder.

FIG. 1 shows a block circuit diagram of the tape recorder. It is assumed, by way of example, that the tape recorder can record signals onto, and replay signals from, any one of twenty eight tracks on the magnetic tape, and the tape recorder therefore has twenty eight record/replay modules of which only one, 10, is shown in FIG. 1. The module 10 comprises a recording head 12 which is driven by recording circuitry to be described in more detail below and represented by the block 14. The recording circuitry 14 receives signals from an input terminal 16 via an input selector switch 18, which can alternatively feed signals from a calibration oscillator 20 to the recording head 12.

In addition, the module 10 has a replay head 21 which picks up recorded signals from the magnetic tape and feeds them, via a pre-amplifier 22, into replay circuitry which will be described in more detail below and which is shown by the block 23 in the Figure. The replay signals are passed to an output terminal 24.

The module 10 includes a positive and negative peak detector 25 and a selector 26 which can connect the detector 25 to the record or the replay circuits 14, 23.

A selector switch 32 can select either the output of the peak detector 25 or a third harmonic detector 27 and pass it to an analogue-to-digital converter 34.

The third harmonic detector 27 is supplied with the output of the pre-amplifier 22 via a switch 28. The switch 28 also feeds the output of the pre-amplifier to a peak detector 29 which detects the peak of the fundamental signal. Detector 29 feeds its output to a switch 30 and thence to the analogue-to-digital converter 34 to act as a reference for a purpose to be explained. The switch 30 enables a fixed reference to be fed to the analogue-to-digital converter 34 instead, from a reference source 31.

The third harmonic detector 27 and the analogue-to digital converter 34 are common to all twenty eight record/replay channels. Also provided is an output amplifier 35 fed by the output of the pre-amplifier 22.

The tape recorder is controlled by a microprocessor 36. The microprocessor has associated with it a read only memory (ROM) 38 and a random access memory (RAM) 40 to which it is connected by a data channel 42. Control signals produced by the microprocessor 36, and signals to be received by the microprocessor 36, pass to and from the microprocessor via a channel 44 and an input/output unit 46.

Digital signals from the analogue-to-digital converter 34, and representing digital versions of the outputs of the peak detector 25 or the third harmonic detector 27, are passed to the input/output unit 46, and thence to the microprocessor 36, via a data channel 48.

The microprocessor 36 is connected, through the input/output unit 46, to control the calibration oscillator 20, the selector switch 18, the record circuits 14, the replay circuits 23, the selector 26, and the switches 29, 30 and 32 via a control channel 50.

The microprocessor 36 also communicates with the tape transport system, shown generally by the block 52, via a channel 54, and can thus drive the tape to any desired position and at any selected speed, and monitor the position of the tape at any time.

The module 10 may be in the form of a pluggable unit, in which case the heads 12 and 21 may be separate from the module.

Figure 2:
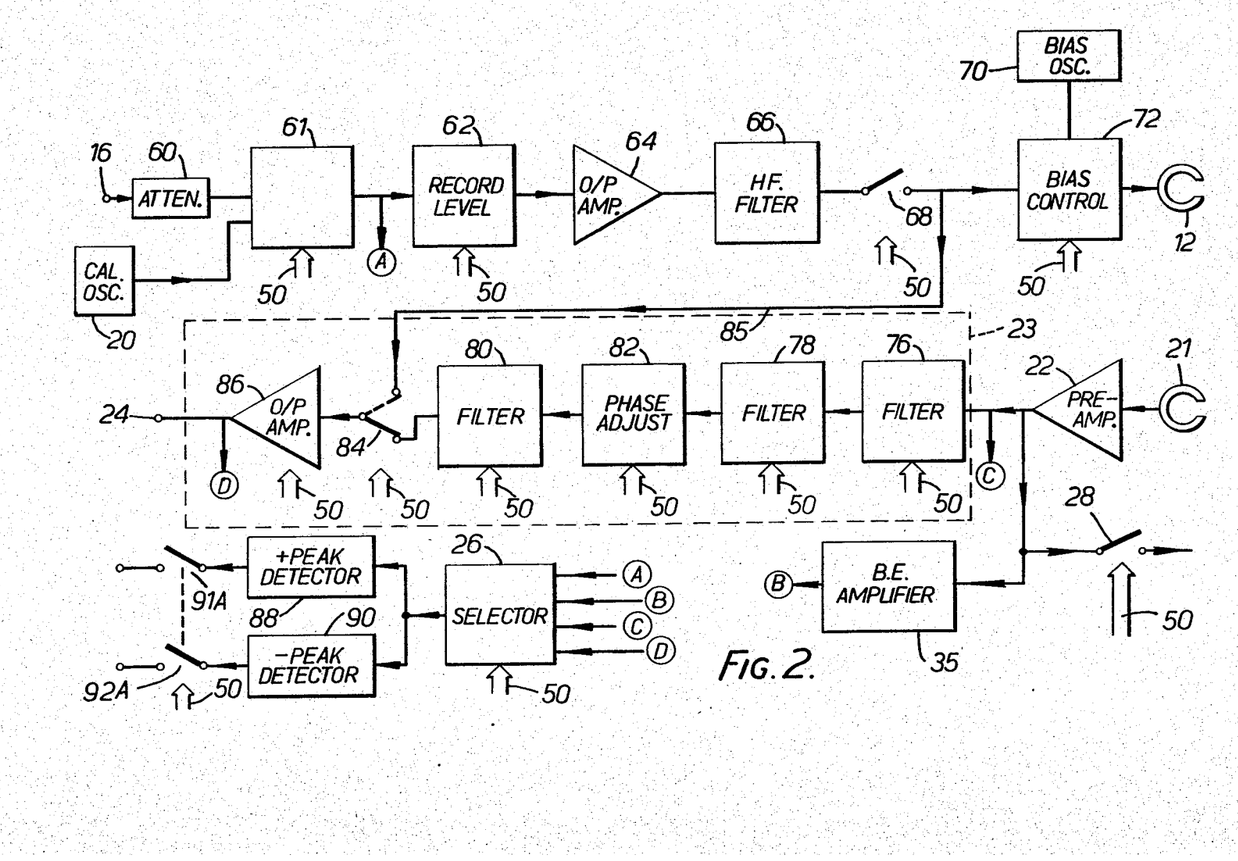
FIG. 2 is a more detailed block circuit diagram of part of the tape recorder.

FIG. 2 shows one of the record/replay channels in more detail.

As shown, the recording circuitry 14 (see FIG. 1) receives input signals to be recorded from the input terminal 16 via an attenuator 60 (not shown in FIG. 1) or alternatively the output from the calibration oscillator 20, via a switch 61. The recording circuitry 14 comprises a record level control unit 62 which is controllable, via the control channel 50, to set the record level. The resultant output is amplified by an output amplifier 64 and fed to a filter circuit 66 which has a characteristic such as to increase the output level at higher frequencies. The output is then fed to the record head 12 via a switch 68 which is controllable by the control channel 50. Also fed to the record head 12 is the output of a bias oscillator 70 via a bias control 72, the bias control being set via the control channel 50.

The replay circuits 23 in the channel receive the output signals picked up from the tape by replay head 21 and these are amplified by the pre-amplifier 22 and then fed to a chain of filters.

The filters determine the shape of the frequency response of the replay circuits, and each filter primarily controls the output level at a particular part of the frequency band in which the recorder is operative, though it will have some effect on the output level outside this band.

More specifically, filter 76 controls the output level at a frequency of 0.4 band edge, that is, 0.4 times the frequency of the upper end of the frequency band in which the recorder is operating.

Filter 78 controls the output at 0.8 band edge, and filter 80 controls the output at band edge.

Finally, filter 82 controls the phase of the output signal.

Filters 76 to 82 are controllable by means of a control channel 50.

The output of filter 80 is fed through a switch 84 to an output amplifier 86 and thence to output terminal 24.

The responses of the filters 76 to 82 and the output level of the output amplifier 86 are adjusted by means of the control channel 50 in a manner to be explained.

The record/replay channel also includes a positive peak detector 88 and a negative peak detector 90 (together constituting the peak detector shown by block 25 in FIG. 1) whose outputs can be selected alternatively by means of the control channel 50 via switches 91A and 91B and fed to the analogue-to-digital converter 34 (see FIG. 1) via switch 32 (not shown in FIG. 2).

The peak detectors 88 and 90 are fed through selector switch 26 with signals derived from points A, B, C and D in the channel, the actual connections being omitted for clarity from the Figure. The selector switch 26 is controlled by the control channel 50.

The microprocessor 36 controls the settings of the various selector switches by means of appropriate controls sent on the control channel 50. In addition, however, the microprocessor 36 can adjust various parameters of the record and replay circuits. It does this by sending an appropriate digital signal to the particular circuit to be adjusted, the digital signal being (in one embodiment of the invention) a number in the range decimal 1 to decimal 255 whose value determines the value to which the particular parameter is to be set. The circuit responds to the received digital signal by appropriately adjusting the parameter.

In addition, the microprocessor 36 can adjust the output frequency of the calibration oscillator 20 (see FIG. 1) in similar fashion.

Some examples of automatic calibration processes which can be carried out will now be described with reference to FIG. 3 and the flow chart of FIGS. 4A and 4B. In these Figures, "B.E", refers to "band edge", that is, the frequency of 250 kHz in the example being described. As already indicated, the automatic calibration arrangement can carry out separate calibration from the record circuitry and the replay circuitry. Initially, calibration of the record circuitry will be described. The calibration arrangement can calibrate the circuitry of various types of channel, e.g. Direct Recording (DR), Frequency Modulation (FM), Pulse Code Modulation (PCM) and High Density Digital Recording (HDDR) but initially calibration of DR channels will be described.

At the beginning of the process, the microprocessor sends digital control signals to adjust the parameters in all the record and replay circuits to a predetermined nominal setting, which may be at the midpoint of their range.

Figure 3:
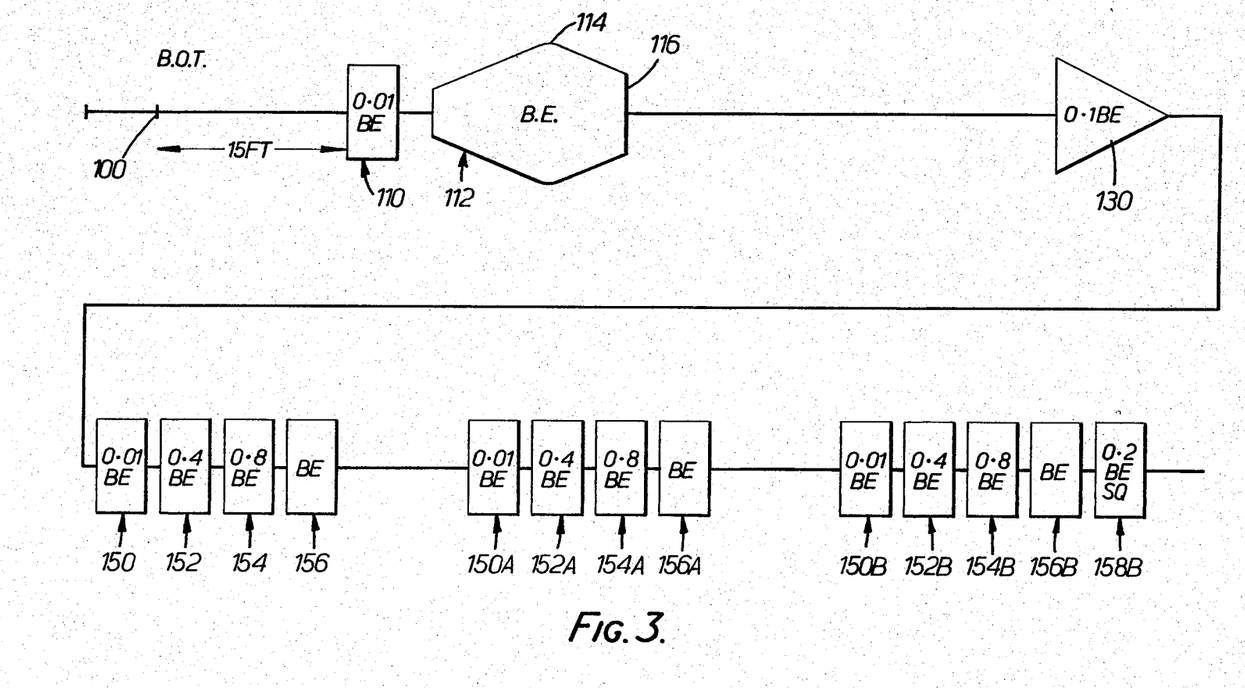
FIG. 3 diagrammatically illustrates signals recorded on the magnetic tape of the tape recorder during the calibration process.

FIG. 3 shows a diagram of a length of the magnetic tape and illustrates some of the calibration signals which are recorded onto it. The beginning of the tape (BOT) is shown at 100.

Figure 4A:
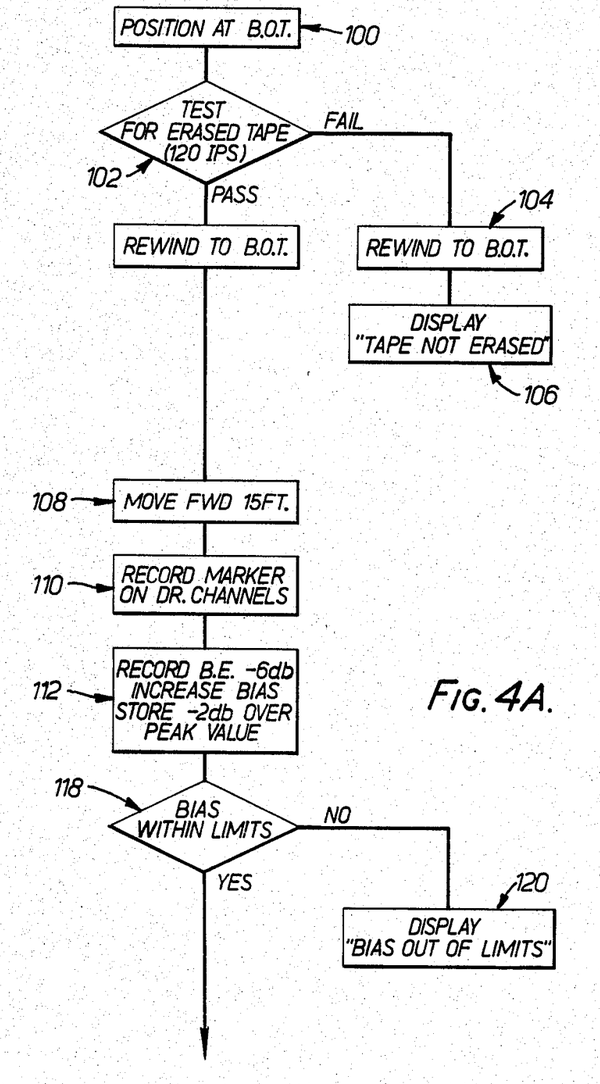
FIGS. 4A and 4B are flow charts for explaining the operation of the calibrating arrangement during calibration of the record circuits of the tape recorder.
Figure 4B:
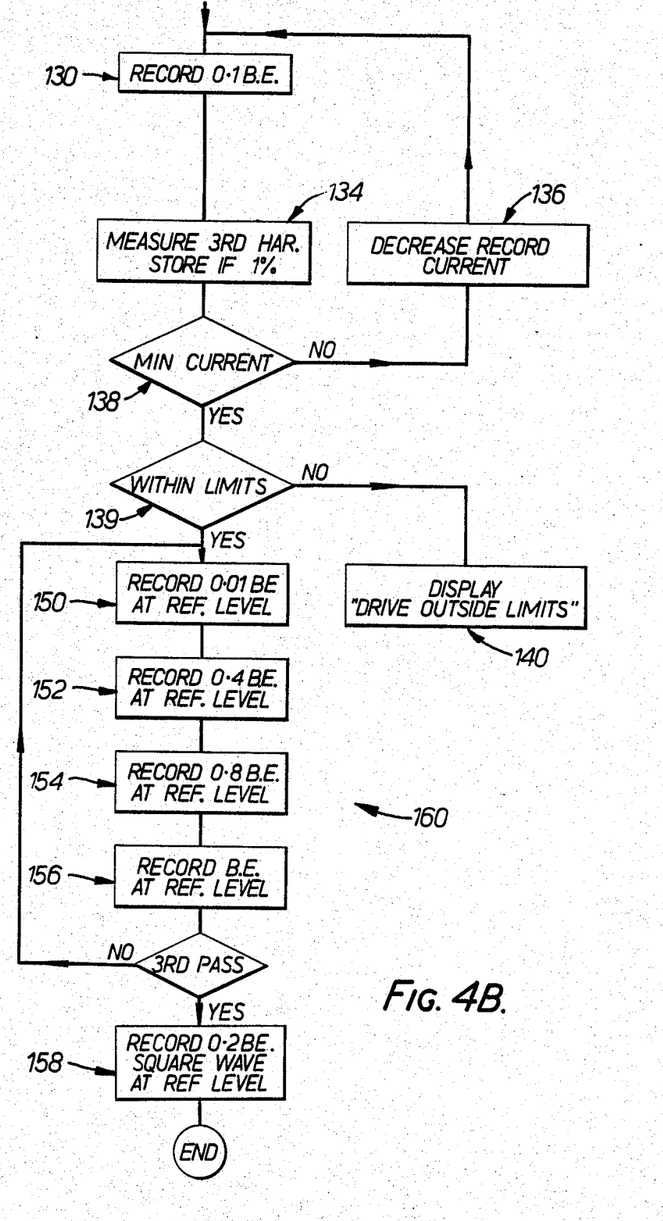

The microprocessor 36 then activates the tape transport 52 (FIG. 1) to run approximately 100 feet (30.48 meters) of the tape through the machine at a relatively high speed (120 inches or 304.8 cm per second say) and monitors the output of the replay circuits of all DR channels to ensure that the tape is completely erased, as shown at 102 in FIG. 4. If the tape fails this test, that is, if it is not completely erased in these channels, the tape is rewound to BOT as shown at 104 in FIG. 4 and a "TAPE NOT ERASED" signal is displayed to the operator as shown at 106. The operator may then remove the tape and have it bulk-erased, and then re-commence the test.

Assuming, however, that the tape is detected as being properly erased over the initial 100 feet (30.48 meters), the microprocessor rewinds the tape to BOT as shown at block 108 in FIG. 4 and then moves it forward by 15 feet (4.57 meters) in this example: see block 108, FIG. 4. This movement takes place at the particular recording speed selected, 15 inches or 31.8 cm per second for example corresponding to band edge of 250 kHz.

The microprocessor then adjust the calibration oscillator to a frequency of 0.01 band edge (2.5 kHz) and records a signal at this frequency on the tape for one second in each of the DR channels being calibrated. This is shown at block 110 in FIGS. 3 and 4 and represents a "calibration marker", that is, an indication of the start of the calibration process.

In the particular example being discussed, the first parameter to be adjusted is the bias level in each DR channel.

To carry out the adjustment of the bias, the microprocessor first sets the calibration oscillator 20 to band edge frequency and then adjusts the output level of the oscillator 20 and the record level of each channel so as to apply a predetermined and constant level signal to each record head. The microprocessor then sets selector 26 (see FIG. 2) so as to select the output received via connections B-B through amplifier 35 which is tuned to band edge frequency and thus represents the replayed version of the predetermined and constant level signal applied to each record head.

The microprocessor 36 then adjusts the level of the calibration oscillator 20 to a fixed predetermined level, which may for example be 6 dB down on the nominal reference level.

The microprocessor then adjusts the bias control 72 of each channel so that the bias applied to the associated record head is zero.

As the tape continues to move past the record heads for each track, the microprocessor increases the bias applied to each head from zero to maximum, as indicated by block 112 in FIG. 4, and the correspondingly numbered block in FIG. 3 shows the resultant signal which is recorded on each track. Thus, as the bias is increased, the signal recorded will increase in amplitude to a maximum, indicated at 114 and will then start to decrease again until the bias reaches a maximum level at 116 (FIG. 3). The microprocessor records the bias levels successively applied to each record head and the corresponding recorded signal amplitudes during this process (measuring the recorded signal amplitudes via the amplifier 35 as explained). The bias level in each channel corresponding to a recorded signal level 2 dB down with respect to the peak at the point 114 (FIG. 3) is selected as the desired bias level, and the microprocessor therefore sets each bias control 72 to this value.

In this way, the bias is calibrated for each DR channel.

During this process, the microprocessor checks to ensure that the bias in each channel is set within predetermined limits. These limits may comprise a lower limit close to but above zero bias and a higher limit close to but below maximum bias. As shown by block 118 in FIG. 4, if, in any channel, the bias level, as set during the process described above is outside these limits, a "BIAS OUT OF LIMITS" indication is given to the operator as shown by the block 120, FIG. 4. This may for example indicate a fault in the record circuits or in the record head or a defective tape.

Calibration of the record current in each channel is now carried out.

This process is carried out at 0.1 band edge (25 kHz) and the microprocessor therefore sets the calibration oscillator 20 accordingly. The record head (in each channel) therefore begins to record a signal at this frequency on the corresponding track on the tape, as shown by blocks 130 in FIGS. 3 and 4. The microprocessor monitors the level of the signal input via connections A—A in FIG. 2 and selector switch 26, while continuously decreasing the record current in each channel. During this process, switch 28 is closed and the microprocessor monitors the output of the third harmonic detector 27 (FIG. 1), which is switched to each DR channel in turn, via the switch 32 and the analogue-to-digital converter 34. Switch 30 (FIG. 1) is set so that the analogue-to-digital converter 34, instead of having a fixed reference, has a reference which depends on the level of the fundamental frequency, this being obtained from the detector 29. Thus the ouput of the converter 34 is truly dependent on the third harmonic content, even though the output level is varying.

When the microprocessor detects that the output contains 1% third harmonic, the value of the record current at this time is stored for each channel. The process is halted when the minimum record current is reached. The process is indicated by the blocks 132, 134, 136 and 138 in FIG. 4B.

The value of the record current at the instant when 1% third harmonic is detected is monitored (see block 139, FIG. 4B) by the microprocessor to check that it falls within predetermined limits, the lower one of which may be close to but above minimum record current and the upper one of which may be close to but below maximum current. If the drive current at this point is outside the limits, the display "DRIVE OUTSIDE LIMITS" is indicated to the operator as shown by block 140. If it is within limits, then this drive current is stored as being the optimum drive current for that channel, that is, the drive current giving maximum output without exceeding the permissible level of third harmonic distortion.

This now completes the calibration of the record circuits, in the particular example being described.

However, the microprocessor records further signals on the tape for the purposes of enabling calibration of the replay circuits to be carried out if and when desired.

As shown in FIGS. 3 and 4, the microprocessor adjusts the calibration oscillator 20 to frequencies of 0.01 band edge (2.5 kHz), 0.4 band edge (100 kHz), 0.8 band edge (200 kHz), and band edge (250 kHz), in turn and records signals at each of these frequencies at the reference level, as shown by blocks 150, 152.

As indicated by the loop 160 in FIG. 4, this process is then repeated twice more to record further blocks at the same frequencies on the tape, as shown by the blocks 150A to 156A and 150B to 156B.

The microprocessor now switches the oscillator 20 from producing sine wave outputs to produce a square wave output, at 0.2 band edge (50 kHz), and this is recorded on the tape as shown by the block 158B.

The record circuits of the recorder have now been calibrated and calibration signals have now been recorded on the tape ready for calibrating the replay circuits either of the recorder by means of which they have been recorded or of another recorder to which the tape may be transferred.

Figures 5, 6:
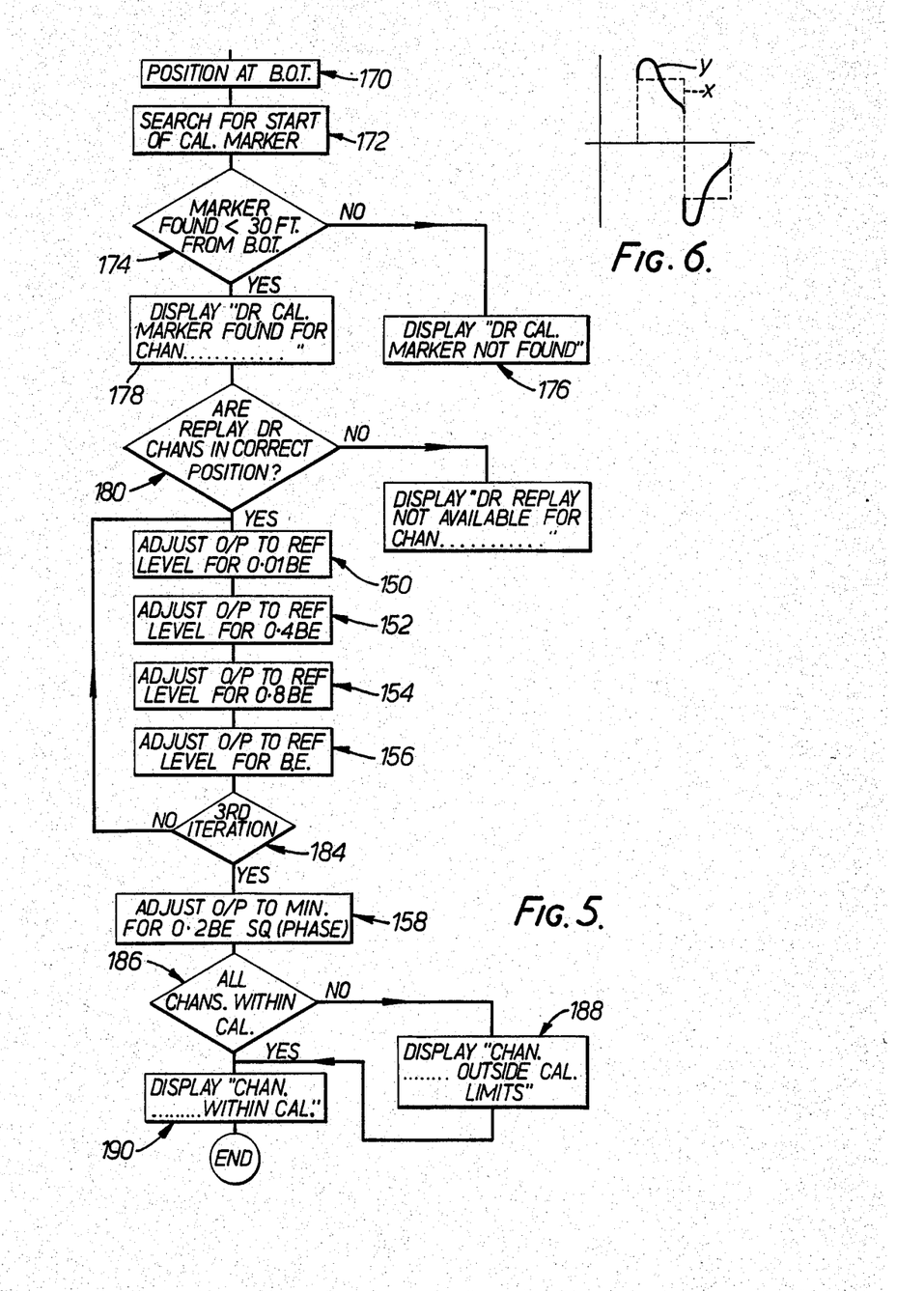
FIG. 5 is a flow chart for explaining the operation of the calibrating arrangement during the calibration of the replay circuits of the tape recorder.
FIG. 6 is a waveform occurring during calibration of the phase adjustment circuit of the recorder.

FIG. 5 illustrates the replay calibration process.

Initially, as shown by block 170, the tape is positioned at BOT. The microprocessor then advances the tape and monitors the output of the replay circuits in each channel to search for the calibration marker (block 110 in FIG. 3). Because there may be an initial error in the measurement of tape position, detection of the calibration marker anywhere within 30 feet of BOT is considered to be a valid detection. As shown by blocks 172, 174 and 176 in FIG. 5, if the calibration marker is not found for any channel, an indication "DR CAL. MARKER NOT FOUND" is displayed to the operator. As indicated by block 178, an indication "DR CAL.MARKER FOUND FOR CHANNELS . . . " is displayed to the operator for those channels where calibration markers are detected within the 30 foot length.

If the replay circuits being calibrated are replay circuits of a different recorder from the one used to make the recording, it is necessary to check that the particular channels where calibration markers had been detected are in fact channels which are set up for Direct Recording, as indicated by blocks 180 and 182. If any of the detected channels are not available for DR, then an indication "DR REPLAY NOT AVAILABLE FOR CHANNELS . . . " is displayed to the operator.

Assuming, however, that all the channels where calibration markers are detected are available for DR, calibration of the replay circuits in each of these channels now begins, the microprocessor stepping the tape on from the calibration marker 110 in FIG. 3 to the first recorded replay calibration signal, block 150.

As the replay head in each channel being calibrated replays the 0.01 band edge signal represented by block 150 in FIG. 3, the microprocessor adjusts the output amplifier 86 to produce the required output level, this being monitored via the selector switch 29 and the connections D—D.

The block 152 is then read from the tape and the microprocessor adjusts the filter 76 (FIG. 2) in each channel to produce the required output level.

In similar fashion, the microprocessor adjusts filters 78 and 80 as the blocks 154 and 156 are replayed.

As indicated by the block 184 in FIG. 5, the calibration process is repeated twice more, using the recorded calibration signals 150A to 156A and 150B to 156B, see FIG. 3.

As block 158B is replayed, the microprocessor adjusts the phase control circuit 82 in each channel. As has been explained, the block 158 represents a square wave at 0.2 band edge (50 kHz). When the phase adjustment in each channel is correct, the output waveform replayed in that channel will be as close as possible to a square wave. This condition is checked for by monitoring the peak level of the output amplifier 86 in each channel by means of the positive and negative peak detectors 88 and 90 and the connections D—D and the selector switch 29. If the phase adjustment is incorrect, the output waveform will not be of the correct shape and the distortion will be such that the peak level will be increased. This is shown in FIG. 6, where the waveform X shows the shape of the recorded calibration signal and the ideal shape of the replayed signal, and the waveform Y shows distortion due to incorrect phase adjustment. Therefore, the microprocessor adjusts the phase adjustment circuit 82 in each channel to produce minimum peak output, and in this way correct phase adjustment is achieved.

The microprocessor then checks whether all channels are within calibration limits, that is, whether their respective parameters have been set within predetermined ranges less than the maximum range of adjustment. As shown by blocks 186, 188 and 190, the microprocessor provides indications "CHANNELS NUMBERS... OUTSIDE CAL.LIMITS" and/or "CHANNELS NUMBERS . . . WITHIN CAL.LIMITS" as appropriate to the operator.

This concludes the calibration of the replay circuits.

FIG. 2 shows the components of the replay circuitry 23 and it is apparent that none of this is used in the calibration of the record circuits. Therefore, recorders not having replay circuits (that is, not having the components shown within the block 23 in FIG. 2) can still calibrate their record circuits and can still record the calibration frequencies as shown by the blocks 150 to 156, 150A to 156A and 150B to 158B in FIG. 3, these thus being available for calibrating replay circuitry of another recorder.

It should be understood that the record and replay calibration sequences described above are merely examples of calibration sequences which can be adopted.

Other parameters can of course be calibrated using the same principles.

The arrangement is such that any particular parameter is calibrated for all the channels under calibration before going on to the next parameter.

Although the calibration process has been described in relation to the direct recording (DR) channels, other types of channel may be calibrated using similar principles. For example, FM (frequency modulation), PCM (pulse code modulation) and HDDR (high density digital recording) channels may be calibrated in similar fashion. For calibrating FM channels, the automatic calibration arrangement can be used to align the modulator and demodulator in each channel as well as the record and bias currents. The modulator and demodulator may be calibrated without any need to move the tape. This can be done, for example, by using the microprocessor to set the calibration oscillator 20 to the centre frequency of the FM range and to feed this direct to the demodulator, the microprocessor then checking for zero output. The microprocessor can also be used to feed predetermined d.c. levels into the demodulator whose resultant output is then connected directly to the demodulator and the demodulated output compared with the required levels.

When the calibrating arrangement has determined the correct value for a parameter being calibrated, it not only sets the parameter to that value but also stores the value.

Switch 68 prevents inadvertent recording (e.g. of noise) on the tape.

There may be a separate bias driver 70 (See FIG. 2) for each channel but all would be controlled by a single master oscillator.

The line 85 and switch 84 in FIG. 2 enable direct monitoring of the output of the recording circuitry if desired.

What is claimed is:

1. An automatic calibration system for calibrating parameter-adjusting circuits in magnetic recording and reproducing apparatus having magnetic recording means and reproducing means, recording circuitry including said parameter-adjusting circuits connected to said magnetic recording means, and reproducing circuitry including said parameter-adjusting circuits connected to said magnetic reproducing means, comprising
   means generating a first calibrating signal for calibrating a predetermined parameter adjusted by one said parameter-adjusting circuit of the recording circuitry,
   means automatically recording the calibrating signal onto a magnetic storage medium via the said one parameter-adjusting circuit of the recording circuitry and the magnetic recording means of the apparatus,
   first adjusting means connected to the magnetic reproducing means for automatically monitoring the value of the reproduced recorded signal independently of any parameter-adjusting circuits and operative in dependence on the value of the monitored signal to automatically adjust the said predetermined parameter adjusted by the said one parameter-adjusting circuit of the recording circuitry,
   means generating a second calibrating signal for calibrating a predetermined parameter adjusted by one said parameter-adjusting circuit of the reproducing circuitry, means automatically recording the second calibrating signal onto a magnetic storage medium via the said one parameter-adjusting circuit of the recording circuitry after that parameter-adjusting circuit has been adjusted by the first adjusting means, and second adjusting means for monitoring the recorded second calibrating signal as it is reproduced from the magnetic storage medium by the magnetic reproducing means and the parameter-adjusting circuits of the reproducing circuitry and operative in dependence on the value of the reproduced second calibrating signal to calibrate the said one parameter-adjusting circuit of the reproducing circuitry of the apparatus.

2. A system according to claim 1, in which the said first adjusting means comprises a separate circuit path by-passing the parameter-adjusting circuits of the reproducing circuitry.

3. An automatic calibrating arrangement for use with and incorporated in magnetic recording and reproducing apparatus employing recording and reproducing head means for recording signals onto and reproducing them from a magnetic storage medium, the apparatus having recording circuitry and reproducing circuitry which respectively include calibrating circuits for setting predetermined recording and reproducing parameters, the calibrating arrangement comprising generating means in the apparatus storing a plurality of predetermined calibration and control signals, control means responsive to the generated signals to read them out in a predetermined sequence and, in response thereto, to energise the recording circuitry of the apparatus so as to record the calibration signals on the magnetic storage medium, the control means including monitoring means which is operative to monitor the value of the recorded signals as they are reproduced from the magnetic storage medium independently of the calibrating circuits of the reproducing circuitry and means operative, in response to the values of the reproduced signals, to calibrate the bias level and the record current calibrating circuits respectively controlling the recording bias level applied to the head means and the record current of the recording circuitry, means operative in response to the generated calibration and control signals to record on the magnetic storage medium, by means of the head means and the recording circuitry, after the bias level calibrating circuit and the record current calibrating circuit thereof have been calibrated, a sequence of signals at different predetermined frequencies which are positioned adjacent the lower end, adjacent the upper end, and between those ends, of a frequency band of the apparatus and at predetermined amplitudes, and means operative in response to the magnitude of the reproduced signals as reproduced by the head means and reproducing circuitry, to automatically adjust the calibrating circuits of the reproducing circuitry so that the reproduced signals have predetermined magnitudes.

4. An arrangement according to claim 3, in which the control means includes means operative in response to the generated calibration and control signals to apply a substantially constant-amplitude record signal to the head means via the recording circuitry and, simultaneously, to adjust the calibrating circuit in the recording circuitry controlling the bias level applied to the head means so as to increase that bias from a relatively low level towards a maximum level, and means operative to monitor the magnitude of the corresponding signal reproduced from the storage medium independently of the calibrating circuits of the reproducing circuitry so as to detect when the level of the reproduced signal corresponds to an optimum value for the bias level and to set the bias level of the corresponding calibrating circuit in the recording circuitry at that value.

5. An arrangement according to claim 4, in which the optimum value of the bias level corresponds to a value of the reproduced signal which is less by a predetermined amount than the peak value thereof.

6. An arrangement according to claim 3, the control means includes means operative in response to the generated calibration and control signals to record a signal on the magnetic storage medium at a predetermined frequency by means of the recording circuitry and the head means, means operative to monitor the value of the third harmonic of the predetermined frequency, as reproduced by the head means independently of the calibrating circuits of the reproducing circuitry, while the record current to the head means is changed, so as to determine the value of the record current when the level of the third harmonic reaches a predetermined limit, and means to set the corresponding calibrating circuit of the recording circuitry so as to calibrate the record current to that value.

7. An arrangement according to claim 6, in which the said means operative to monitor the value of the third harmonic comprises means for measuring the value of the third harmonic of the predetermined frequency in the form of means for comparing the value of the third harmonic at that frequency with the value of the fundamental at that frequency.

8. An arrangement according to claim 3, in which the recording circuitry comprises circuitry parameters whereof are adjustable by means of digital control signals which are produced by the control means.

9. An arrangement according to claim 3, in which the said monitoring means in the control means comprises circuit means by-passing the calibrating circuits of the reproducing circuitry, for monitoring the value of the reproduced recorded signals independently of the calibrating circuits of the reproducing circuitry.

10. An arrangement according to claim 3, in which the control means also includes means responsive to the generated calibration and control signals for recording on the magnetic storage medium, by means of the head means and the recording circuitry after the calibrating circuits thereof have been calibrated, a signal consisting of a substantially rectangular wave at a predetermined frequency and with a predetermined amplitude, and means operative in response to the corresponding reproduced signal as reproduced by the head means and reproducing circuitry to adjust the phase of the reproduced signal until the magnitude of the reproduced signal is at a minimum.

11. An arrangement according to claim 3, in which the said apparatus is a multi-channel magnetic tape recorder having a plurality of record heads each with its associated said recording circuitry.

12. A method of automatically calibrating calibrating circuits in the recording circuitry and the reproducing circuitry of magnetic recording and reproducing apparatus having a recording head associated with the recording circuitry and also having a reproducing head associated with the reproducing circuitry, comprising the steps of generating a bias calibrating signal for calibrating that calibrating circuit of the recording circuitry which calibrates bias level, recording the bias calibrating signal onto a magnetic storage medium via the recording circuitry, reproducing the recorded signal from the storage medium independently of any calibrating circuits of the reproducing circuitry, measuring the value of the reproduced said signal, calibrating the bias level calibrating circuit of the recording circuitry in dependence thereon generating a reproducing circuit calibrating signal for calibrating one of the calibrating circuits of the reproducing circuitry, recording that calibrating signal on the magnetic storage medium via the recording circuitry after the calibrating circuits of the recording circuitry have been calibrated, reproducing the recorded reproducing circuit calibrating signal from the storage medium via the calibrating circuits of the reproducing circuitry, measuring the value of the reproduced said reproducing circuit calibrating signal, and calibrating at least the said one calibrating circuit of the reproducing circuitry in dependence on the measured value.

13. A method according to claim 12, in which the step of recording the said bias calibrating signal on the magnetic storage medium comprises the steps of applying a substantially constant-amplitude signal to the input of the recording circuitry and, simultaneously, increasing the bias applied by the bias level calibrating circuit from a relatively low level towards a maximum level, the step of measuring the value of the reproduced signal comprises the step of monitoring the magnitude of the signal reproduced from the storage medium so as to detect when the value thereof corresponds to an optimum value for the bias, and the step of setting the bias level calibrating circuit comprises the step of setting that circuit so as to set the bias at the said optimum value.

14. A method according to claim 12, including the steps of responding to a further one of the said generated signals by recording a signal on the magnetic storage medium at a predetermined frequency by means of the recording circuitry, varying the record current applied to the recording head, continuously monitoring the recorded signal as it is reproduced from the storage means by the reproducing head but independently of any calibrating circuits of the reproducing circuitry so as to monitor the value of the third harmonic of the predetermined frequency, determining the value of the varying record current when the level of the third harmonic reaches a predetermined limit, and adjusting the record current calibrating circuit in the recording circuitry so as to calibrate the record current at the said determined value thereof.

15. A method according to claim 14, in which the step of monitoring the level of the third harmonic of the predetermined frequency comprises the step of comparing the value of the third harmonic at that frequency with the value of the fundamental at that frequency.

16. A method according to claim 12, comprising the steps of generating in the said apparatus a calibrating signal for calibrating a calibrating circuit of reproducing circuitry in another magnetic recording and reproducing apparatus, recording that calibrating signal on the magnetic storage medium of the first mentioned apparatus via the recording circuitry thereof after the calibrating circuits of that recording circuitry have been calibrated, transferring the storage medium to the said other apparatus, reproducing the recorded signal from the transferred storage medium via the calibrating circuits of the reproducing circuitry of that other apparatus, measuring the value of the reproduced said calibrating signal, and calibrating at least one said calibrating circuit of the reproducing circuitry of the said other apparatus in dependence on the measured value.

17. A method according to claim 14, including the steps of responding to further ones of the generated signals after the bias level and record current calibrating circuits of the recording circuitry have been calibrated, by recording on the magnetic storage medium, by means of the record head and the recording circuitry, a sequence of signals at different predetermined frequencies which are positioned adjacent the lower end, adjacent the upper end, and between those ends, of a predetermined frequency band of the apparatus and at predetermined amplitudes, measuring the magnitudes of the reproduced signals as reproduced by the reproducing head and the reproducing circuitry, and adjusting the calibrating circuits of the reproducing circuitry so that the reproduced signals have predetermined magnitude.

18. A method according to claim 17, including the steps of responding to yet further ones of the generated signals after the bias level and record current calibrating circuits of the recording circuitry have been calibrated, by recording on the magnetic storage medium, by means of the record head and the recording circuitry, a signal consisting of a substantially rectangular wave at a predetermined frequency and with a predetermined amplitude, reproducing the recorded signals by means of the replay head and the recording circuitry, and adjusting one of the calibrating circuits of the reproducing circuitry so as to adjust the phase of the reproduced signal until the magnitude of the reproduced signal is at a minimum.

\* \* \* \* \*